Nov. 25, 1924.

G. W. GOMBER 1,517,210

ANIMAL TRAP

Filed March 14, 1923   3 Sheets-Sheet 1

Fig.8ᵃ

George W. Gomber
INVENTOR

WITNESSES
Louis Goodman
Philip E. Liggens

ATTORNEY

Nov. 25, 1924.   1,517,210
G. W. GOMBER
ANIMAL TRAP
Filed March 14, 1923    3 Sheets-Sheet 2
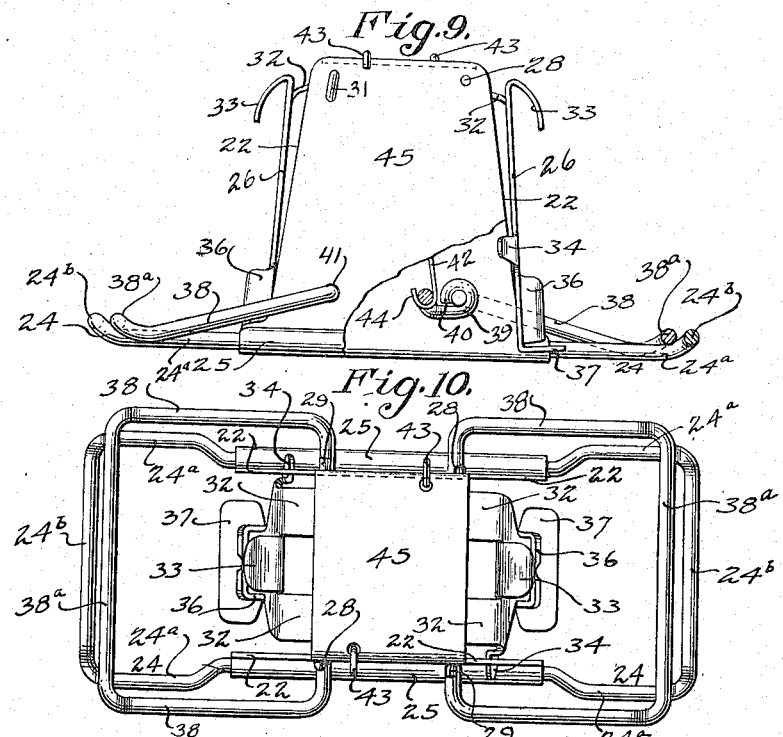
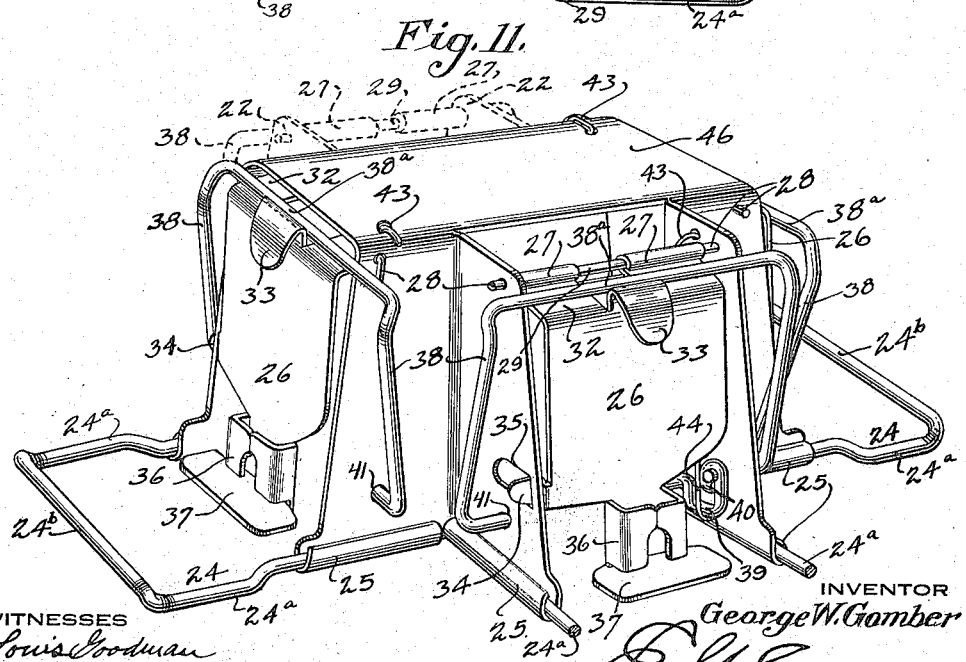
WITNESSES
INVENTOR
George W. Gomber
BY
ATTORNEY Nov. 25, 1924. 1,517,210
G. W. GOMBER
ANIMAL TRAP
Filed March 14, 1923  3 Sheets—Sheet 3
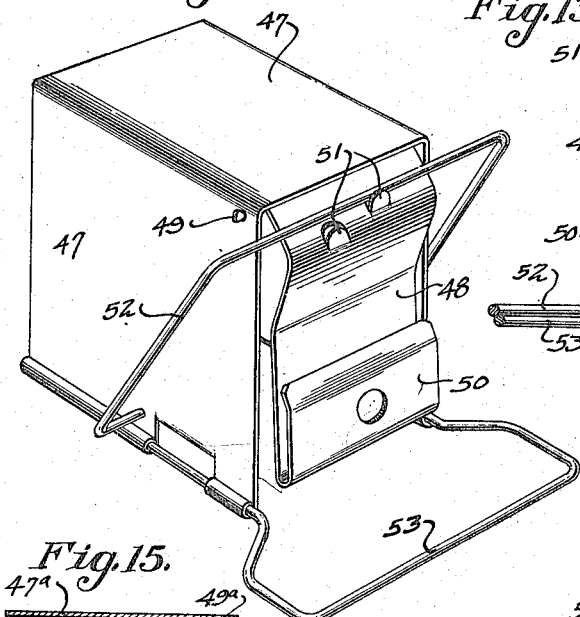
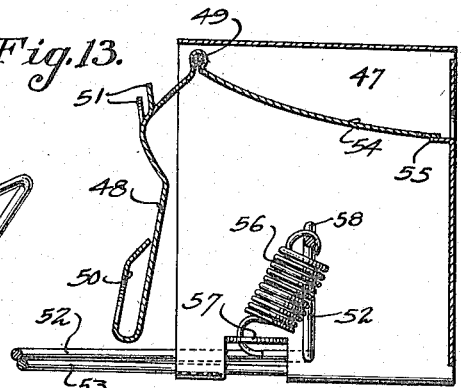
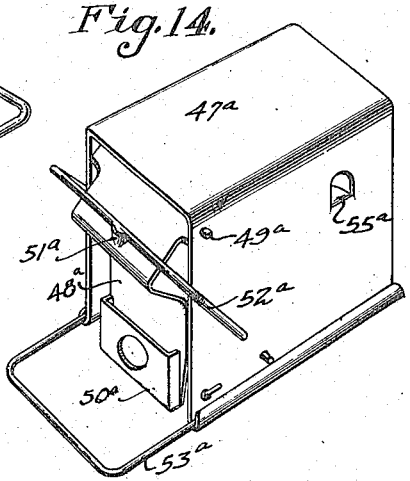
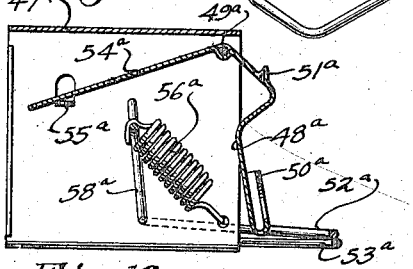
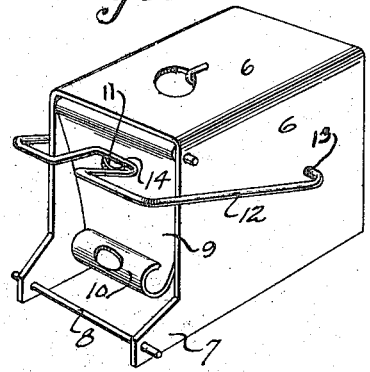
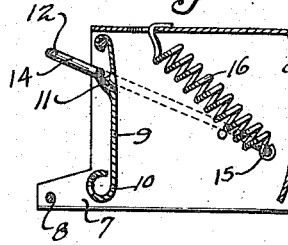
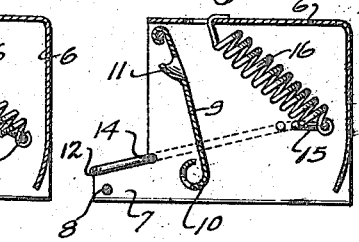
WITNESSES
Louis Goodman
Philip E. Ligger.
INVENTOR
George W. Gomber
BY
ATTORNEY Patented Nov. 25, 1924.

1,517,210

UNITED STATES PATENT OFFICE.

GEORGE W. GOMBER, OF CONYNGHAM, PENNSYLVANIA, ASSIGNOR TO A. W. DRAKE MANUFACTURING COMPANY, OF HAZLETON, PENNSYLVANIA, A CORPORATION OF PENNSYLVANIA.

ANIMAL TRAP.

Application filed March 14, 1923. Serial No. 625,110.

*To all whom it may concern:*

Be it known that I, GEORGE W. GOMBER, a citizen of the United States, residing at Conyngham, in the county of Luzerne and State of Pennsylvania, have invented a new and useful Improvement in Animal Traps, of which the following is a specification.

This invention relates to animal traps, and while especially directed to mouse and rat traps, presents improvements in traps of a type capable of catching larger animals.

Some of the objects of the invention are to provide a trap of economical construction, one which is durable and easily cleaned so that it may be kept sanitary, which is quickly set without danger of injury to the operator, which is not sprung by mere jarring of the trap or the overloading of the trigger element with bait, and in which the movable jaw is promptly sprung by actual movement of the trigger, the said jaw striking the animal with a descending swinging movement that exerts its greatest force near the lower limit of its movement.

This invention is a continuation in part of my application, Serial No. 574,539, filed July 12, 1922; and a further object is to effect improvements in the trap constructions disclosed in said application, and particularly to provide a trap employing considerably less metal which is easier to assemble, one which will catch an animal with more certainty, and which may be set in any position of the trap.

The invention has many other objects which will appear as the description is proceeded with.

In the accompanying drawings forming part of this specification, there are shown for illustrative purposes, several embodiments of my invention.

Figure 1 of the drawings is a perspective view of a preferred embodiment of the invention, showing the trap set;

Figures 7, 8:
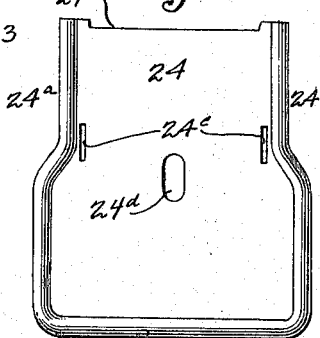
Figure 7 is a plan view of the base or bottom of the trap.
Figure 8 is a detail view partly in section, of the lower end of the casing.

Figure 8$^a$ is a plan view of one form of spring which may be used to hold the bait trigger normally in jaw-engaging position;

Figures 9 and 10 are respectively a side elevation and a plan view of a slightly modified form wherein two of the traps shown in the previously described figures are combined;

Figure 11 is a perspective view showing a further modification, wherein three of the traps are combined, a fourth being indicated in dotted lines;

Figures 12 and 13 are respectively a perspective view and a vertical section of another form which the invention may assume;

Figures 14 and 15 are similar views of still another form;

Figures 16, 17 and 18 are respectively a perspective view and two vertical sectional views which illustrate still another embodiment of the invention, these views being taken from my previously filed application.

Referring more specifically to the drawings, and first to Figures 1 to 8$^a$ inclusive, there is shown a trap body 20, which, by preference, is made from a single piece of sheet metal, stamped out, so that its cost of manufacture is low. The preferred form of the body includes a rear wall 21, a pair of side walls 22 bent at right angles, and a top wall or cover 23 also integral with the rear wall and bent at right angles, so that a form of box or housing is provided, with the rear wall 21 having a projection 21$^a$ at the bottom and the side walls each having at the lower end a projection 22$^a$ (Fig. 8). It may be desired to give the housing a tapering form, as clearly shown in Figures 3 and 4, with the wider end lowermost. A hole 21$^b$ is provided in the rear wall for the attachment of a chain to anchor the trap.

24 is a bottom or base (Fig. 7) stamped from sheet metal, having at its sides and front rolled or beaded edges 24$^a$, 24$^b$, the front edge 24$^b$ constituting the stationary jaw of the trap and being upturned so as to be arranged above the plane of the side edges 24$^a$. The base or bottom is provided with slots 24ᶜ to receive the projections 22ᵃ of the side walls of the housing, while the projection 21ᵃ of the rear wall fits in the recess 24ᵉ of the bottom. By this arrangement the base or bottom is locked to the housing (Figs. 3 and 4) and forms a bottom for the latter. A hole 24ᵈ is provided in the bottom for a purpose to be later explained.

The front of the housing preferably is substantially closed by a bait carrying trigger plate 26, whose upper end has rolls 27 pivoted on one arm of a spring element 28, as shown separately in Figure 8ᵃ.

Figure 1:
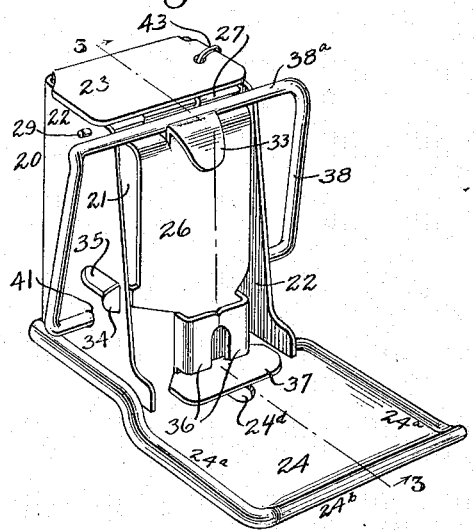
Figure 2:
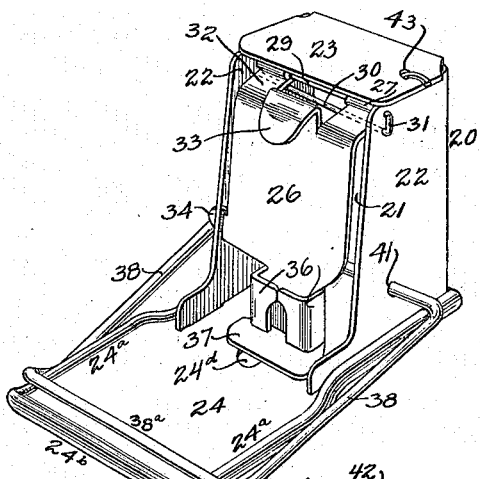
Figure 2 is a similar view looking from another angle, showing the trap sprung.

The spring 28 consists of two arms 29, 30 joined by a short bend 31, and the arms are non-parallel. The arm 29 is the longer, and it is this arm which swingably carries the bait trigger. The rolls 27 are at the extremity of the trigger plate 26, which is preferably bent short of its upper end, as indicated at 32. The spring 28 is thrust through two perforations provided near the upper end of the right hand side wall 2, as shown in Figure 2, and arm 29 extends transversely of the trap through a perforation near the top of the opposite side wall, as shown in Figure 1. The other arm 30 of the spring bears against the bent section 32 of the trigger plate so as to cause the plate to move outwardly relative to the casing or housing. Any other form of spring may, however, be provided to accomplish the intended purpose.

At the top of the plate 26, a catch is provided for the movable jaw, said catch preferably in the form of an integral tongue 33 struck from section 32 and bent downwardly. At one edge, and near the lower end, the trigger plate has an arm 34 projecting therefrom, said arm entering a slot 35 (Fig. 1) in one of the walls 22 so as to provide a stop for the trigger plate. Obviously many other forms of stops may be used to prevent spring 28 from moving the trigger plate too far forward.

The lower end of the trigger plate is fashioned into a bait carrier, which may be made up of a pair of inturned flanges 36 forming a pocket with the plate 26 and with an outwardly extending shelf 37. The particular means shown for holding the bait, while preferred, may be replaced by other well known bait holders.

Figure 4:
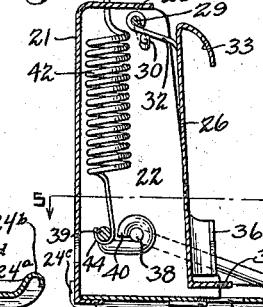
Figure 4 is a similar view but showing the trap sprung.
Figure 5:
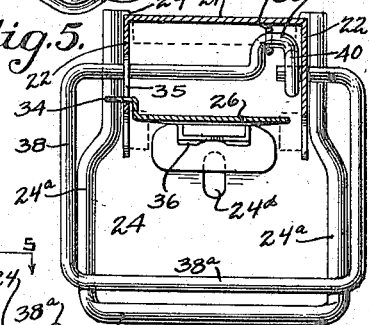
Figure 5 is a horizontal section on the line 5—5 of Figure 4.
Figure 6:
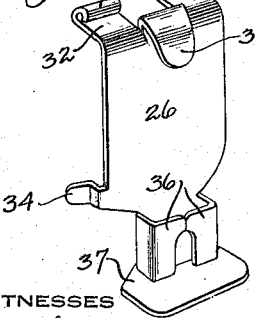
Figure 6 is a perspective view of the preferred form of bait trigger.

In Figure 5 the movable jaw 38 is shown in plan, and as seen consists of a closed more or less rectangular loop, preferably of wire, having a bend 39 disposed in a plane at an angle to the plane of the main part of the loop. The extremity 40 of bend 39 is coiled to receive the other end of the wire loop (Figures 4 and 5). Each of the walls 22 is perforated as at 41 to provide for the pivotal support of jaw 38.

Figure 3:
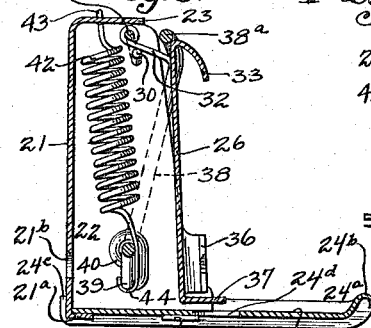
Figure 3 is a vertical section on the line 3—3 of Figure 1.

The loop which forms the movable jaw is wider than the fixed jaw, so that the side arms thereof extend beyond the sides of the bottom, while the cross bar 38ᵃ of the movable jaw, when in closed position, engages the sides of the bottom in rear of the front edge of the latter and which forms the fixed jaw. To cause the movable jaw 38 to swing downward forcibly, a spring 42, preferably a coil spring, is housed within the body and is attached at its upper end 43 to the casing in any desirable way, while at its lower end 44 it is attached to bend 39 of the movable jaw. The spring 42 is disposed nearly vertically within the trap; and because of the angular position of bend 39, the spring pulls with greatest force on the jaw when the jaw is about closed, as will be understood from Figure 4. This is the relatively contracted position of the spring. When the jaw is raised, as shown in Figure 3, there is relatively little tendency for the jaw to move downwardly, due to the fact that bend 39 is then nearly alined with the line of the pull of the spring. In other words, as the jaw descends, the leverage acted upon by the spring increases until the jaw is substantially in its lowest position, where it will hold the victim securely back of the neck. The blow from such a jaw is usually sufficient to break the backs of rats or mice.

To set the trap, all that is necessary is to lift jaw 38 until it slides over tongue 33; as soon as the jaw touches tongue 33 the trigger plate is forced inwardly against the resistance of spring 28, but when the jaw once gets above said tongue the spring 28 moves the trigger plate outwardly, so that the upper end of the jaw is caught by that part of the tongue which projects above bend 32 and said jaw is securely held, as shown in Figure 3. The slightest movement of the trigger plate, however, releases the jaw 38, which closes with a powerful snap upon the stationary jaw. As shown in Figure 4, the cross bar of the movable jaw engages the sides of the bottom in rear of the stationary jaw.

The advantages of the solid base or bottom which forms the stationary jaw of the trap, are first; that it assures freedom of movement of the trigger by protecting it from any upward projection on the surface, when the trap is set on an uneven surface; and second; it compels the animal to place its weight on the trap when pushing the bait trigger while nibbling the bait, thereby preventing any possibility of the animal pushing the whole trap without springing it.

In the construction shown in Figures 9 and 10, a single housing 45 has two oppositely facing and independently acting trap structures, both like the trap described above, except there is no bottom. The lower edges of the sides 22 of the housing are secured to a substantially U-shaped stationary jaw 24, by any well known mechanical expedient, as for instance, by means of rolled ends 25 gripping the extremities of the side arms of said jaw. The stationary jaw 24 is held in a horizontal position so as to enlarge the base of the trap, and hence increases its stability. It is preferably made of heavy wire as shown, with side arms 24$^a$ and a connecting cross arm 24$^b$, which is upturned and arranged above the plane of the side arms. This construction takes the place of the bottom or base previously described, and is illustrated merely to show how the construction of the trap may be varied. I prefer, however, that the base or bottom be provided on all the traps, for reasons which will be explained. A further description is deemed unnecessary. In Figure 11, three of the traps are provided on a single body 46, but facing in three different directions. A fourth trap is indicated in dotted lines. Obviously such duplication may be carried on as far as desired.

In the modified trap of Figures 12 and 13, the body or housing 47 is made from a single piece of material closed at the top, rear and two sides, but open at the front for trigger plate 48 which is carried by a rod 49 at the top of the trap. The trigger plate 48 has a bait holder 50 at its lower end, and near the upper end has one or more struck-out lips 51 adapted to be engaged by the movable jaw 52. The fixed jaw 53 is secured as in the last described form. In order to impart to the trigger plate a normal tendency to swing out, so that it will engage with the jaw 52 to cause "automatic" setting of the trap (that is, setting independent of the operator's fingers), an extension 54 of the trigger plate 48 is provided. This extension serves as a counterweight, and takes the place of spring 28. A bent-in tongue 55 provides a stop to check outward swinging of the trigger plate beyond a certain point. In this form of the invention, the spring 56 is secured at its lower end to a bent flange 57 of the trap body, while its upper end is joined to a right angular bend 58 of the movable jaw 52.

In the embodiment of the invention illustrated in Figures 14 and 15, all the elements are analogous to those of the construction shown in Figures 12 and 13, and the arrangement of parts is only slightly different. Similar parts in Figures 12, 13 and 14, 15 are correspondingly designated, with the letter "a" added to each reference numeral used in Figures 14 and 15.

The trap construction shown in Figures 16, 17 and 18 is the same as the one shown and described in my application above referred to, and is shown in Figures 1, 4 and 5 of the drawings forming part of said application. The same reference numerals are used in both instances. Housing 6 has extensions 7 between which stretches a bar or rod 8 forming the stationary jaw. The trigger plate 9 is pivoted at the top of the housing 6 and has a bait holder 10 at its lower end. Near the top the trigger plate has a struck-out lip 11 with which the movable jaw 12 engages, an inwardly bent loop 14 being provided for this purpose. A coil spring 16 has its upper end fast to the trap body and the lower end connected with the arm 15 of the jaw 12, to cause the jaw to descend with an acceleration upon the fixed jaw. Further details of the construction it is unnecessary to describe. The plate 9 is maintained in a vertical position by gravity, and is moved inwardly by loop 14 when the jaw 12 is lifted to set the trap, but swings outwardly as soon as jaw 12 rises above lip 11, whereupon the jaw catches above said lip.

In all forms of the invention, the setting is a safe and sure operation, the jaw closes with great force and rapidity, and the operation is exceedingly sensitive. In all forms the trigger plate is pivoted at the top to the body or housing and is movable outwardly by gravity or by a spring. The operator catches hold of the side arms of the movable jaw 38 (Figs. 1 to 5 inclusive), or 52, (Figs. 12, 13), or 52$^a$ (Figs. 14 and 15), or 12 (Figs. 16, 17, 18) and swings the jaw upwardly to be engaged by the trigger plate. In this operation even if the trap should be sprung, the operator's fingers would not be caught.

The housing may be grasped by the hand and the trap freely moved from place to place without liability of injury. If in carrying or setting the trap, the jaw slips, it will snap to closed position without catching the finger. The trap may be sprung in perfect safety by moving the trigger plate from underneath, a feature of considerable value when it is remembered that the operation of traps usually must be demonstrated before they can be sold. The hole 24$^d$ is provided in the base or bottom (Fig. 7) so that a salesman may project a pencil through the hole and engage the trigger 26 and thus demonstrate the operation of the trap. Furthermore, the trigger plate will not be affected by jarring or overloading with bait; its sensitiveness will be the same regardless of the position in which the trap is held. Most traps of the described type, if made sensitive enough, are sprung by a change in position, or by a slight jar, such as is given the traps in laying them down; and it is frequently a matter of great annoyance to handle such traps, because they are more successful in catching fingers than rodents. My invention provides a trap which has the best qualities of impalement traps, and none of their drawbacks.

While I have shown and described several embodiments of the invention, it is obvious that many changes from the described construction involving omission, alteration, substitution and reversal of parts may be made without involving invention, and it is therefore, to the claims that one must refer for the definiteness of my invention.

What is claimed is:

1. In a trap, a housing or body, a jaw pivotally mounted on the housing to swing downwardly across the front of the trap, a trigger plate adapted to substantially close said trap front and to engage the jaw to hold the trap set, and a spring housed within the trap body and secured thereto and to the inner end of the pivotally mounted jaw.

2. In a trap, a frame having an open front, a trigger plate adapted to substantially close said front, means for pivoting the trigger plate at its upper portion to the frame, said trigger plate being movable outwardly of the housing and depending from the top of the frame and accessible for operation at the bottom of the trap, a jaw pivotally mounted on the frame and adapted to be engaged with the trigger plate when swung upwardly to set the trap, and a spring for the jaw.

3. In a trap, a housing having an open front, a jaw pivotally mounted on the housing to swing downwardly across the front of the trap, a spring for the jaw, a trigger plate pivoted at its upper end to the top of the housing and substantially closing the open front thereof, means for moving the trigger plate outwardly, means for limiting the outward movement of the trigger plate, and means on the trigger plate to be engaged by the jaw when the latter is swung upwardly to set the trap.

4. In a trap, a body including a top, two sides and a back, the front being open, a jaw pivotally mounted on the body to swing downwardly, a pivoted trigger plate adapted to substantially close said open front and freely movable at its lower end, and means on the trigger plate to be engaged by the jaw when the jaw is swung upwardly to set the trap.

5. In a trap, a housing or body, a jaw composed of a single piece of wire bent to form a substantially closed loop of approximately rectangular configuration, said jaw being of greater width than the housing and pivoted to the sides thereof in rear of the front of the housing and swinging downwardly across said front, the sides of the jaw which project from the sides of the housing being grasped when setting the trap, a spring for the jaw, a trigger plate pivotally mounted at its upper end to the top of the housing or body and freely movable at its lower end, said trigger plate being movable outwardly of the housing and extending to the bottom of the trap, where it is accessible for manipulation from the underside of the trap.

6. In a trap, a housing having an open front, a base secured to the housing and projecting outwardly therefrom, said base being provided with an opening, a movable jaw pivoted to the housing, a spring for said jaw, and a trigger element pivoted at its upper end to the housing and depending therefrom and substantially closing the front of the housing, the lower end of the trigger element being freely movable and located, when the trap is set, directly above said opening in the base.

7. In a trap, a housing, a frame having an open front, a trigger element pivoted at its upper end to the top of the housing or frame and depending therefrom to the bottom of the trap, a bait element carried by the trigger element at its lower end, a base secured to the bottom of the housing and projecting outwardly therefrom, said base having an opening, said lower end of the trigger element being freely movable and located above said opening in the base, and a movable jaw pivoted in the sides of the housing below the pivot of the trigger element and engaged with the latter near is upper end to set the trap, said trigger element being capable of manipulation by hand through said opening at the under side of the trap.

8. In a trap, a body including a top, two sides, an open front and a back, a jaw of greater width than the body pivoted to the sides and adapted to swing across the front, a trigger element mounted at the front to swing inwardly of the body, and a spring within the body and secured thereto and to the rear end of the jaw.

9. In a trap, a body or frame having its front end open and a stationary jaw at the bottom of said end, a movable jaw pivoted to the body so as to move over the front end from top to bottom, a trigger plate substantially closing the open front of the body, a spring for said jaw arranged within the body, and means on the trigger plate to engage the jaw to hold it in its raised or set position.

10. In an impalement trap, a support, a movable jaw, a swingably mounted trigger element pivoted at its upper end upon the support and maintained substantially vertical, the lower end of the trigger element being bent at right angles to provide a shelf, and an integral bait holder fashioned from the trigger element consisting of a pocket with an opening above the shelf, and means adjacent the upper end of the trigger element adapted to hold the movable jaw of the trap in set position.

11. In an impalement trap, a trigger plate formed from a single piece of material and having means at its upper end whereby it may be pivoted, a tongue struck out from said upper end and bent down over the plate to provide a catch for the movable jaw of the trap, a bait holder provided at the lower free end of the trigger plate, and an arm integral with the plate and adapted to be used as a stop to limit its movement.

12. In a trap, a body, a movable jaw pivoted upon the body, a trigger plate swingably mounted on the body, and a resilient element having two non-parallel arms mounted on the body, one of said arms serving as the pintle upon which the trigger plate swings, the other of the arms bearing against the trigger plate to cause it to swing away from the body.

13. In an impalement trap, a housing, a trigger element, a base or bottom secured to and closing the bottom of the housing and projecting outwardly therefrom, said base or bottom being formed of raised sides with a raised front which is bent upwardly above the sides, a movable jaw, and a spring for moving said jaw, said movable jaw being formed of a single piece of wire into a loop of approximately rectangular configuration wider than the bottom and journaled in the housing, said movable jaw having a transverse cross bar engaging with the sides of the base or bottom in rear of the raised front.

14. In an impalement trap, a housing, a vertically disposed trigger element pivoted at its upper end to the housing and depending therefrom, a fixed jaw secured to the lower end of the housing and projecting outwardly from the latter, below and beyond the trigger element and enclosing the latter and providing an extended base for the trap, a movable jaw pivoted to the housing and consisting of side arms and a cross bar, the latter movable across the trigger element and engaged thereby, and a spring for the movable jaw.

15. In a trap, a housing having projections at its side walls and rear wall, a bottom forming the fixed jaw of the trap having slots or recesses to receive said projections to hold the parts together, said bottom forming an extended base for the trap, a trigger pivoted at the front of the trap and terminating above the bottom, a movable jaw, and a spring for the latter.

16. In an impalement trap, a housing, a vertically disposed trigger element pivoted at its upper end to the housing and depending therefrom, a fixed jaw in the form of a plate secured to the lower end of the housing and projecting outwardly from the latter below and beyond the trigger element and protecting the latter from being actuated and providing an extended base for the trap, a movable jaw pivoted to the housing, and a spring for the movable jaw.

In testimony that I claim the foregoing as my own, I have hereto affixed my signature.

GEORGE W. GOMBER.